(12) United States Patent
Tseng et al.

(10) Patent No.: US 12,108,434 B2
(45) Date of Patent: Oct. 1, 2024

(54) WIRELESS COMMUNICATION APPARATUS HAVING DYNAMIC TRANSMISSION BANDWIDTH ALLOCATION MECHANISM AND DYNAMIC TRANSMISSION BANDWIDTH ALLOCATION METHOD THEREOF

(71) Applicant: REALTEK SEMICONDUCTOR CORPORATION, Hsinchu (TW)

(72) Inventors: Chun-Kai Tseng, Hsinchu (TW); Shau-Yu Cheng, Hsinchu (TW); Wen-Yung Lee, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 329 days.

(21) Appl. No.: 17/715,483

(22) Filed: Apr. 7, 2022

(65) Prior Publication Data

US 2022/0361189 A1    Nov. 10, 2022

(30) Foreign Application Priority Data

May 10, 2021    (TW) .................................. 110116806

(51) Int. Cl.
*H04W 72/543* (2023.01)
*H04W 72/121* (2023.01)
*H04W 72/541* (2023.01)

(52) U.S. Cl.
CPC ....... *H04W 72/543* (2023.01); *H04W 72/121* (2013.01); *H04W 72/541* (2023.01)

(58) Field of Classification Search
CPC ............. H04W 72/543; H04W 72/121; H04W 72/541; H04W 72/51; H04W 72/0453;

(Continued)

(56) References Cited

U.S. PATENT DOCUMENTS 10,484,057 B2 * 11/2019 Wang .................... H04L 5/0023
11,309,935 B1 * 4/2022 Vishwakarma ....... H04L 51/212
(Continued)

OTHER PUBLICATIONS

D.Bankov, A.Didenko, E.Khorov and A.Lyakhov, "OFDMA Uplink Scheduling in IEEE 802. 11ax Networks," 2018 IEEE ICC., 2018.
(Continued)

*Primary Examiner* — Dady Chery
(74) *Attorney, Agent, or Firm* — WPAT, P.C

(57) ABSTRACT

The present disclosure discloses a dynamic transmission bandwidth allocation method having dynamic transmission bandwidth allocation mechanism used in a wireless communication apparatus is provided that includes the steps outlined below. Interference information and transmission ability information of remote wireless communication apparatuses is retrieved. A predetermined transmission bandwidth range that includes resource units is set. The remote wireless communication apparatuses are allocated in the predetermined transmission bandwidth range to generate an allocation result. Whether the allocation result satisfies resource unit allocation criteria is determined. When the allocation result does not satisfy the resource unit allocation criteria, the predetermined transmission bandwidth range is shrunk to another allocatable transmission bandwidth range to determine whether the allocation result satisfies the resource unit allocation criteria. When the allocation result satisfies the resource unit allocation criteria, the remote wireless communication apparatuses are allocated according to the allocation result to perform communication thereto through a communication circuit.

10 Claims, 4 Drawing Sheets

(58) Field of Classification Search
CPC .. H04J 11/0026; H04L 27/2601; H04L 5/003; H04L 5/0058
See application file for complete search history.

(56) References Cited

U.S. PATENT DOCUMENTS

| | | | |
|---|---|---|---|
| 2002/0168983 A1* | 11/2002 | Kumaran | H04W 16/18 455/446 |
| 2012/0314665 A1* | 12/2012 | Ishida | H01Q 21/28 370/329 |
| 2014/0187255 A1* | 7/2014 | Dimou | H04W 72/541 455/452.2 |
| 2015/0043437 A1* | 2/2015 | Chakraborty | H04W 52/243 370/329 |
| 2015/0208436 A1* | 7/2015 | Seok | H04W 74/002 370/329 |
| 2016/0204827 A1* | 7/2016 | Shih | H04B 1/7143 375/132 |
| 2021/0007127 A1* | 1/2021 | Hwang | H04L 5/0044 |
| 2022/0209817 A1* | 6/2022 | Vishwakarma | H04B 1/7143 |

OTHER PUBLICATIONS

K.Wang and K.Psounis, "Scheduling and Resource Allocation in 802.11ax," IEEE Infocom, 2018.

M.Karaca, S.Bastani, B. E.Priyanto, M.Safavi, and B.Landfeldt, "Resource management for OFDMA based next generation 802.11 WLANs," IEEE WMNC, 2016.

* cited by examiner

WIRELESS COMMUNICATION APPARATUS HAVING DYNAMIC TRANSMISSION BANDWIDTH ALLOCATION MECHANISM AND DYNAMIC TRANSMISSION BANDWIDTH ALLOCATION METHOD THEREOF

BACKGROUND OF THE INVENTION

1. Field of the Invention

The present disclosure relates to a wireless communication apparatus having dynamic transmission bandwidth allocation mechanism and a dynamic transmission bandwidth allocation method thereof.

2. Description of Related Art

The development of wireless network technology becomes quicker along with more demands from users. In 802.11ax WiFi standard, the use of orthogonal frequency division multiple access (OFDMA) can decrease addition loading and delay of network transmission.

In order to support OFDMA technology, the frequency bands used to perform data transmission is divided into multiple resource units having different sizes. However, the allocation of the resource units is affected by the operating parameters of participating remote wireless communication apparatuses, e.g., the bandwidth that the station device supports and interference condition thereof. If no efficient allocation method exists, the allocation complexity becomes higher and a quick reaction mechanism to adjust the allocation cannot be accomplished when the allocation result does not match the criteria of the OFDMA technology.

SUMMARY OF THE INVENTION

In consideration of the problem of the prior art, an object of the present disclosure is to provide a wireless communication apparatus having dynamic transmission bandwidth allocation mechanism and a dynamic transmission bandwidth allocation method thereof.

The present disclosure discloses a wireless communication apparatus having dynamic transmission bandwidth allocation mechanism that includes a communication circuit, a storage circuit and a processing circuit. The storage circuit is configured to store a computer executable command. The processing circuit is configured to retrieve and execute the computer executable command to execute a dynamic transmission bandwidth allocation method that includes the steps outlined below. Interference information and transmission ability information of each remote wireless communication apparatuses included in an apparatus list are retrieved. One of allocatable transmission bandwidth ranges for the remote apparatuses is set to be a predetermined transmission bandwidth range, wherein the predetermined transmission bandwidth range includes multiple resource units (RUs). The remote wireless communication apparatuses are allocated in the predetermined transmission bandwidth range according to the interference information and the transmission ability information to generate an allocation result. Whether the allocation result satisfies resource unit allocation criteria is determined. The predetermined transmission bandwidth range is shrunk to another one of the allocatable transmission bandwidth ranges when the allocation result does not satisfy the resource unit allocation criteria, so as to determine whether the allocation result generated accordingly satisfies the resource unit allocation criteria. Each of the remote wireless communication apparatuses is allocated to one of the resource units according to the allocation result when the allocation result satisfies the resource unit allocation criteria, so as to perform communication with the remote wireless communication apparatus through the communication circuit.

The present disclosure also discloses a dynamic transmission bandwidth allocation method having dynamic transmission bandwidth allocation mechanism used in a wireless communication apparatus that includes the steps outlined below. Interference information and transmission ability information of each remote wireless communication apparatuses included in an apparatus list are retrieved. One of allocatable transmission bandwidth ranges for the remote wireless communication apparatuses is set to be a predetermined transmission bandwidth range, wherein the predetermined transmission bandwidth range comprises multiple resource units. The remote wireless communication apparatuses are allocated in the predetermined transmission bandwidth range according to the interference information and the transmission ability information to generate an allocation result. Whether the allocation result satisfies resource unit allocation criteria is determined. The predetermined transmission bandwidth range is shrunk to another one of the allocatable transmission bandwidth ranges when the allocation result does not satisfy the resource unit allocation criteria, so as to determine whether the allocation result generated accordingly satisfies the resource unit allocation criteria. Each of the remote wireless communication apparatuses is allocated to one of the resource units according to the allocation result when the allocation result satisfies the resource unit allocation criteria, so as to perform communication with the remote wireless communication apparatus through a communication circuit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a wireless communication apparatus having dynamic transmission bandwidth allocation mechanism and a dynamic transmission bandwidth allocation method thereof to allocate the remote wireless communication apparatuses to the resource units, and to shrink a bandwidth of the resource units to perform allocation again such that the resource units within the transmission bandwidth range can be allocated dynamically and efficiently.

Figure 1:
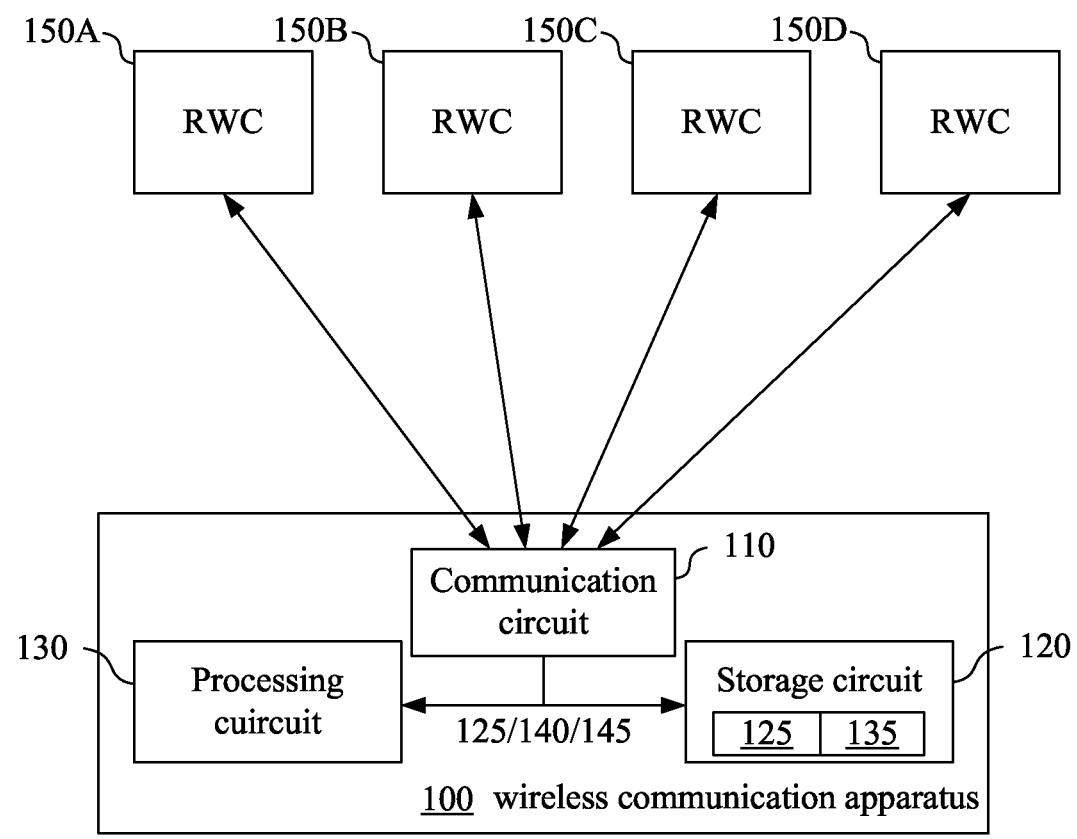
FIG. 1 illustrates a block diagram of a wireless communication apparatus having dynamic transmission bandwidth allocation mechanism according to an embodiment of the present invention.

Reference is now made to FIG. 1. FIG. 1 illustrates a block diagram of a wireless communication apparatus 100 having dynamic transmission bandwidth allocation mechanism according to an embodiment of the present invention.

In the present embodiment, the wireless communication apparatus 100 is an access point apparatus, and each of the remote wireless communication apparatuses 150A~150D (abbreviated as RWC in FIG. 1) is a station apparatus. The wireless communication apparatus 100 is configured to dynamically allocate the remote wireless communication apparatuses 150A~150D to transmission bandwidths based on orthogonal frequency division multiple access (OFDMA) technology, and perform communication with the remote wireless communication apparatuses 150A~150D based on a frequency-division multiplexing method according to the allocation result.

The wireless communication apparatus 100 includes a communication circuit 110, a storage circuit 120 and a processing circuit 130.

The storage circuit 120 can be any kind of storage device that can store a computer executable command 125 and an apparatus list 135. The processing circuit 130 is electrically coupled to the communication circuit 110 and the storage circuit 120 to retrieve and execute the computer executable command 125 from the storage circuit 120. The computer executable command 125 includes such as, but not limited to firmware/driver and related commands of the communication circuit 110 and the storage circuit 120 to access the signal or data of the communication circuit 110 and the storage circuit 120 to perform the function of the wireless communication apparatus 100. The apparatus list 135 includes information of each of the remote wireless communication apparatuses 150A~150D that the wireless communication apparatus 100 is connected to, e.g., interference information 140 and transmission ability information 145 of each of the remote wireless communication apparatuses 150A~150D.

At first, the processing circuit 130 retrieves communication data of each of the wireless communication apparatuses 150A~150D included in the apparatus list 135 stored in the storage circuit 120, e.g., the interference information 140 and the transmission ability information 145.

In an embodiment, the apparatus list 135 includes information related to each of the remote wireless communication apparatuses 150A~150D. The processing circuit 130 may obtain the information by performing communication with the remote wireless communication apparatuses 150A~150D through the communication circuit 110. In an embodiment, the processing circuit 130 may obtain the communication data including the interference information 140 and the transmission ability information 145 during the communication performed with the remote wireless communication apparatuses 150A~150D through the communication circuit 110 so as to establish the apparatus list 135. The communication data described above includes apparatus information used to identify the remote wireless communication apparatuses 150A~150D, such as but not limited to an identification number (ID) and a media access control (MAC) address. The communication data may also include information related to the communication performed between the remote wireless communication apparatuses 150A~150D and the wireless communication apparatus 100, such as but not limited to the interference information 140 and the transmission ability information 145.

In an embodiment, the remote wireless communication apparatuses 150A~150D can measure the communication quality of each of the channels between the remote wireless communication apparatuses 150A~150D and the wireless communication apparatus 100 to generate the interference information 140 and report the information to the wireless communication apparatus 100 in the form of such as, but not limited to a bandwidth query report. The remote wireless communication apparatuses 150A~150D can also report the transmission bandwidth information that the remote wireless communication apparatuses 150A~150D support to the wireless communication apparatus 100, in which such information serves as the transmission ability information 145.

Figure 2:
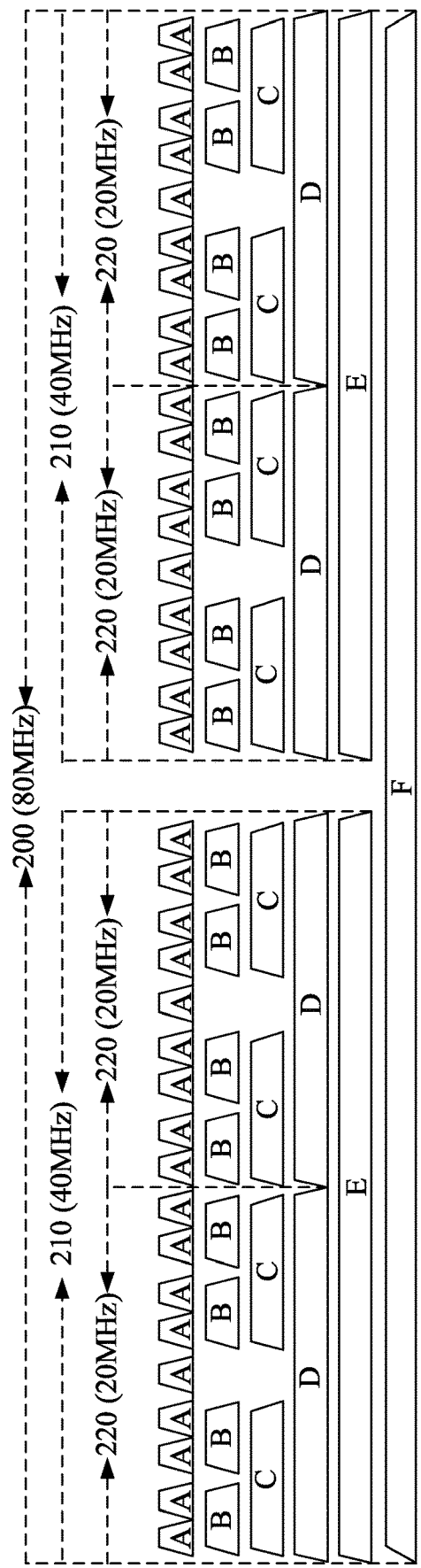
FIG. 2 illustrates a diagram of the allocatable transmission bandwidth ranges according to an embodiment of the present invention.

Subsequently, the processing circuit 130 sets one of allocatable transmission bandwidth ranges to be a predetermined transmission bandwidth range, wherein the predetermined transmission bandwidth range includes multiple resource units. Reference is now made to FIG. 2. FIG. 2 illustrates a diagram of the allocatable transmission bandwidth ranges 200~220 according to an embodiment of the present invention.

In the present embodiment, high efficiency multi-user (HE-MU) access can be performed between the wireless communication apparatus 100 and the remote wireless communication apparatuses 150A~150D through the use of the packet format of physical layer protocol data unit (PPDD).

During the performance of the communication, a symbol is configured by subcarriers or tones. In the allocatable transmission bandwidth ranges of different sizes, the remote wireless communication apparatuses 150A~150D can be allocated to different combinations of subcarriers or tones such that simultaneous data transmission with these apparatuses can be performed. The combination of the tones is called the resource units. In FIG. 2, the largest allocatable transmission bandwidth range of 80 MHz is used as an example. The allocatable transmission bandwidth ranges 200~220 include the resource units of different sizes, which are the 80, 40 and 20 MHz respectively. In each of the allocatable transmission bandwidth ranges 220 having the bandwidth of 20 MHz, 9 resource units A each having 26 tones can be used, 4 resource units B each having 52 tones can be used, 2 resource units C each having 106 tones can be used and 1 resource unit D having 242 tones can be used.

In each of the allocatable transmission bandwidth ranges 210 having the bandwidth of 40 MHz, besides all the resource units included in the two 20 MHz allocatable transmission bandwidth ranges 220 can also be used, 1 resource unit E having 484 tones can be used. In the allocatable transmission bandwidth range 200 having the bandwidth of 80 MHz, besides all the resource units included in the two 40 MHz allocatable transmission bandwidth ranges 210 can be used, 1 resource unit F having 996 tones can also be used.

The allocatable transmission bandwidth range 200 includes 4 basic channels each corresponding to one of the allocatable transmission bandwidth ranges 220. The processing circuit 130 may set one of the basic channels as the primary channel. In an embodiment, the communication quality of the resource units of the primary channel is better than the communication quality of the resource units of the other channels.

In an embodiment, the processing circuit 130 sets the allocatable transmission bandwidth range 200 having the largest bandwidth as the predetermined transmission bandwidth range. Subsequently, the processing circuit 130 allocates the remote wireless communication apparatuses 150A~150D in the predetermined transmission bandwidth range 200 according to the interference information 140 and the transmission ability information 145 to generate an allocation result, in which the allocation result has to satisfy predetermined resource unit allocation criteria.

In an embodiment, the resource unit allocation criteria include having the remote wireless communication apparatuses 150A~150D allocated to the resource units having no bandwidth overlapping each other, having the resource units that at least part of the remote wireless communication apparatuses 150A~150D allocated to correspond to a primary channel, and having an amount of the resource units that the remote wireless communication apparatuses are allocated to exceeds a threshold value.

In an embodiment, when the allocatable transmission bandwidth range includes N basic channels, at least N×4×26 tones are required to be allocated. For the allocatable transmission bandwidth range 200 (80 MHz), N is 4. As illustrated in FIG. 2, one resource unit A includes 26 tones. As a result, according to the requirements described above, 16 resource units A in the allocatable transmission bandwidth range 200 that occupy half of the total bandwidth are required to have the remote wireless communication apparatuses allocated thereto.

When the allocation result does not satisfy the resource unit allocation criteria, the processing circuit 130 shrinks the predetermined transmission bandwidth range 200 to another one of the allocatable transmission bandwidth ranges, e.g., the predetermined transmission bandwidth range 210 or the predetermined transmission bandwidth range 220, so as to determine whether the allocation result generated accordingly satisfies the resource unit allocation criteria.

When the allocation result satisfies the resource unit allocation criteria, the processing circuit 130 allocates each of the remote wireless communication apparatuses 150A~150D to one of the resource units according to the allocation result, so as to perform communication with the remote wireless communication apparatus 150A~150D through the communication circuit 110.

A usage scenario is used as an example to describe the operation of the wireless communication apparatus 100.

Figure 3:
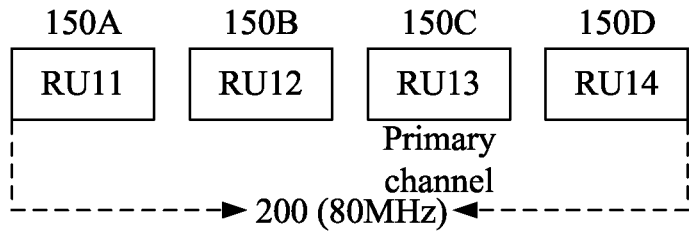
FIG. 3 illustrates a diagram of the remote wireless communication apparatuses allocated to the resource units in the predetermined transmission bandwidth range according to an embodiment of the present invention.

Reference is now made to FIG. 3. FIG. 3 illustrates a diagram of the remote wireless communication apparatuses 150A~150D allocated to the resource units RU11~RU14 in the predetermined transmission bandwidth range 200 according to an embodiment of the present invention. In the present embodiment, each of the resource units RU11~RU14 includes 242 tones and the transmission bandwidth range is 20 MHz (which is equivalent to the resource unit D in FIG. 2), in which the resource unit RU13 is the primary channel and the resource units RU11, RU12 and RU14 are non-primary channels.

The processing circuit 130 allocates the remote wireless communication apparatuses 150A~150D to the predetermined transmission bandwidth range 200 to generate the allocation result.

In an embodiment, processing circuit 130 determines whether the resource units RU11~RU14 cause interference on the remote wireless communication apparatuses 150A~150D according to the interference information 140. In an embodiment, the processing circuit 130 performs determination according to interference parameters included in the interference information 140 such that the processing circuit 130 determines that the resource units RU11~RU14 cause interference on the remote wireless communication apparatuses 150A~150D when the interference parameters are within respective predetermined ranges.

Further, the processing circuit 130 allocates each of the remote wireless communication apparatuses 150A~150D to one of the resource units RU11~RU14 from a lowest frequency to a highest frequency without being interfered thereby according to an order of the transmission ability information 145 and apparatus information of the remote wireless communication apparatuses 150A~150D in the apparatus list 135 to generate the allocation result, in which the order of the apparatus information may include such as, but not limited to the order of the identification number or the media access control address.

In the present embodiment, the resource units RU11~RU14 do not cause interference to each of the remote wireless communication apparatuses 150A~150D and the transmission ability information 145 shows that the remote wireless communication apparatuses 150A~150D all support the transmission ability up to the bandwidth of 80 MHz. The processing circuit 130 can allocate the remote wireless communication apparatuses 150A~150D in an order to one of the resource units RU11~RU14 from the lowest frequency to the highest frequency in the predetermined transmission bandwidth range 200.

In such an allocation result, the remote wireless communication apparatuses 150A~150D are all allocated to the resource units RU11~RU14 having no bandwidth overlapping each other. The remote wireless communication apparatus 150C is allocated to the resource unit RU13 that corresponds to the primary channel. All the resource units RU11~RU14 are allocated. As a result, the allocation result of the remote wireless communication apparatuses 150A~150D satisfies the resource unit allocation criteria.

Further, the processing circuit 130 allocates each of the remote wireless communication apparatuses 150A~150D to one of the resource units RU11~RU14 according to the allocation result, so as to perform communication with the remote wireless communication apparatus 150A~150D through the communication circuit 110.

Figure 4A:
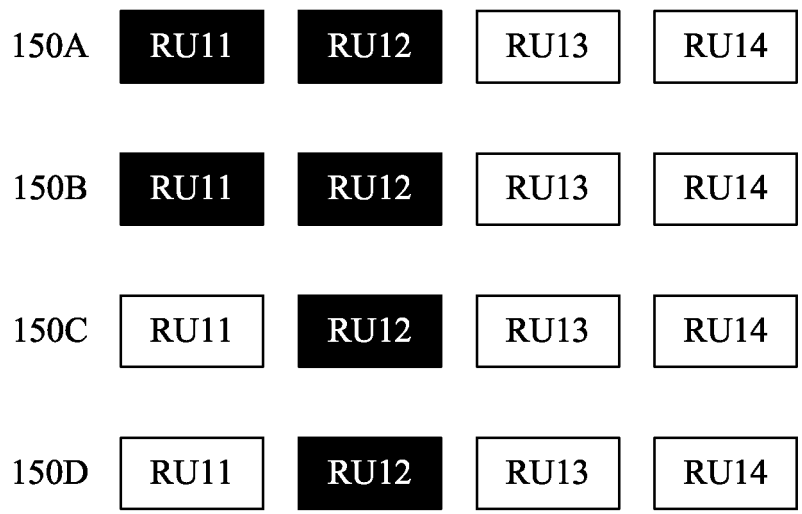
FIG. 4A illustrates an interference relation between the resource units and the remote wireless communication apparatuses according to an embodiment of the present invention.
Figure 4B:
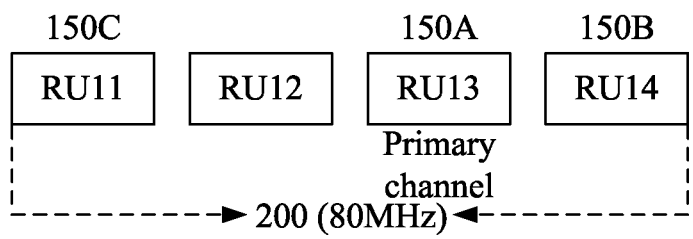
FIG. 4B illustrates a diagram of the remote wireless communication apparatuses allocated to the resource units in the predetermined transmission bandwidth range according to an embodiment of the present invention.

Reference is now made to FIG. 4A and FIG. 4B at the same time. FIG. 4A illustrates an interference relation between the resource units RU11~RU14 and the remote wireless communication apparatuses 150A~150D according to an embodiment of the present invention. FIG. 4B illustrates a diagram of the remote wireless communication apparatuses 150A~150D allocated to the resource units RU11~RU14 in the predetermined transmission bandwidth range 200 according to an embodiment of the present invention.

In the present embodiment, as illustrated in FIG. 4A, the remote wireless communication apparatus 150A is interfered by the resource units RU11 and RU12 illustrated as black blocks. The processing circuit 130 therefore does not allocate the remote wireless communication apparatus 150A to either the resource unit RU11 or the resource unit RU12. The remote wireless communication apparatus 150B is interfered by the resource units RU11 and RU12 illustrated as black blocks. The processing circuit 130 therefore does not allocate the remote wireless communication apparatus 150B to either the resource unit RU11 or the resource unit RU12.

The remote wireless communication apparatus 150C is interfered by the resource unit RU12 illustrated as black blocks. The processing circuit 130 therefore does not allocate the remote wireless communication apparatus 150C to the resource unit RU12. The remote wireless communication apparatus 150D is interfered by the resource unit RU12 illustrated as black blocks. The processing circuit 130 therefore does not allocate the remote wireless communication apparatus 150D to the resource unit RU12.

Further, the processing circuit 130 allocates each of the remote wireless communication apparatuses 150A~150D to one of the resource units RU11~RU14 from a lowest frequency to a highest frequency without being interfered thereby according to an order of the transmission ability information 145 and apparatus information of the remote wireless communication apparatuses 150A~150D in the apparatus list 135 to generate the allocation result, in which the order of the apparatus information may include such as, but not limited to the order of the identification number or the media access control address.

According to the relation illustrated in FIG. 4A, the processing circuit 130 allocates the remote wireless communication apparatus 150A to the resource unit RU13 first and allocates the remote wireless communication apparatus 150B to the resource unit RU14 subsequently. Since no other resource unit exists in a higher bandwidth range and the resource unit RU11 does not cause interference on the remote wireless communication apparatus 150C, the processing circuit 130 allocates the remote wireless communication apparatus 150C to the resource unit RU11.

However, under such a condition, since the resource unit RU12 causes interference on the remote wireless communication apparatus 150D, the remote wireless communication apparatus 150D cannot be allocated to the resource unit RU12. As a result, such an allocation result does not satisfy the resource unit allocation criteria.

When the allocation result does not satisfy the resource unit allocation criteria, the processing circuit 130 shrinks the predetermined transmission bandwidth range 200 to another one of the allocatable transmission bandwidth ranges. The method used to shrink the predetermined transmission bandwidth range can be determined according to the type of a communication packet that is supposed to be transmitted through the communication performed by the processing circuit 130 with the remote wireless communication apparatuses 150A~150D.

In an embodiment, when the communication packet that is supposed to be transmitted through the communication with the remote wireless communication apparatuses 150A~150D is a response packet, such as but not limited to a block acknowledgement (BA) signal, the required processing time is more urgent.

The processing circuit 130 shrinks the predetermined transmission bandwidth range directly to a primary transmission bandwidth range in the allocatable transmission bandwidth ranges 200~220 that corresponds to the primary channel, i.e., the allocatable transmission bandwidth range 220 that corresponds to the resource unit RU13.

Figure 5:
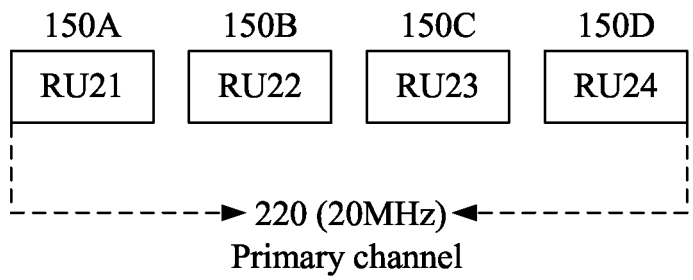
FIG. 5 illustrates a diagram of the remote wireless communication apparatuses allocated to the resource units in the predetermined transmission bandwidth range according to an embodiment of the present invention.

Reference is now made to FIG. 5. FIG. 5 illustrates a diagram of the remote wireless communication apparatuses 150A~150D allocated to the resource units RU21~RU24 in the predetermined transmission bandwidth range 220 according to an embodiment of the present invention. Each of the resource units RU21~RU24 includes 52 tones (which is equivalent to the resource unit B in FIG. 2).

The processing circuit 130 allocates the remote wireless communication apparatuses 150A~150D to the predetermined transmission bandwidth range 220 to generate the allocation result.

Since the resource units RU21~RU24 are all in the primary channel and the primary channel does not cause interference on each of the remote wireless communication apparatuses 150A~150D, the processing circuit 130 allocates each of the remote wireless communication apparatuses 150A~150D to one of the resource units RU21~RU24 from a lowest frequency to a highest frequency without being interfered thereby according to an order of the transmission ability information 145 and apparatus information of the remote wireless communication apparatuses 150A~150D in the apparatus list 135 to generate the allocation result, in which the order of the apparatus information may include such as, but not limited to the order of the identification number or the media access control address.

In such an allocation result, the remote wireless communication apparatuses 150A~150D are all allocated to the resource units RU21~RU24 having no bandwidth overlapping each other. The remote wireless communication apparatuses 150A~150D are allocated to the resource units RU11~RU14 that all correspond to the primary channel. All the resource units RU11~RU14 have the remote wireless communication apparatuses 150A~150D allocated thereto. As a result, the allocation result of the remote wireless communication apparatuses 150A~150D satisfies the resource unit allocation criteria.

Further, the processing circuit 130 allocates each of the remote wireless communication apparatuses 150A~150D to one of the resource units RU21~RU24 according to the allocation result, so as to perform communication with the remote wireless communication apparatus 150A~150D through the communication circuit 110.

In another embodiment, when the communication packet that is supposed to be transmitted through the communication with the remote wireless communication apparatuses 150A~150D is not a response packet, such as but not limited to a data packet, the required processing time is less urgent. The processing circuit 130 shrinks the predetermined transmission bandwidth range according to a size order of the allocatable transmission bandwidth ranges.

For example, when the current predetermined transmission bandwidth range is the allocatable transmission bandwidth range 200, the processing circuit 130 shrinks the predetermined transmission bandwidth range to one of the allocatable transmission bandwidth ranges 210 that includes such as, but not limited to the resource unit RU13 corresponding to the primary channel and the resource unit RU14. The processing circuit 130 allocates the remote wireless communication apparatuses 150A~150D to the four resource units each having 106 tones (which is equivalent to the resource unit C in FIG. 2) in the allocatable transmission bandwidth range 210 to generate the allocation result and determine whether the allocation result satisfies the resource unit allocation criteria.

When the allocation result satisfies the resource unit allocation criteria, the processing circuit 130 allocates the remote wireless communication apparatuses 150A~150D to these resource units according to the allocation result. When the allocation result does not satisfy the resource unit allocation criteria, the processing circuit 130 further shrinks the predetermined transmission bandwidth range 210 to the primary transmission bandwidth range that corresponds to the primary channel, i.e., the allocatable transmission bandwidth range 220 that corresponds to the resource unit RU13.

It is appreciated that in the above embodiments, the largest allocatable transmission bandwidth range that is 80 MHz is used as an example. In other embodiments, the largest allocatable transmission bandwidth range can be 160 MHz or a bandwidth with even larger range. The present invention is not limited thereto.

Further, in the above embodiments, four remote wireless communication apparatuses 150A~150D are used as an example. In other embodiments, the number of the remote wireless communication apparatuses can by any number larger than one. The present invention is not limited thereto. It is appreciated that when the number of the remote wireless communication apparatuses exceeds the total number of the smallest resource units (such as, but not limited to the resource unit having 26 tones), the number of the remote wireless communication apparatuses that can be allocated is also limited by the total number of the resource units.

Moreover, the in the above embodiments, four remote wireless communication apparatuses 150A~150D that all support the transmission ability up to the bandwidth of 80 MHz are used as an example. In other embodiments, the remote wireless communication apparatuses 150A~150D may support the transmission ability of different bandwidths. The present invention is not limited thereto.

As a result, the wireless communication apparatus having dynamic transmission bandwidth allocation mechanism of the present invention uses low-complexity allocation algorithm to allocate the remote wireless communication apparatuses to the resource units and to shrink a bandwidth of the resource units to perform allocation again such that the resource units within the transmission bandwidth range can be allocated dynamically and efficiently.

Figure 6:
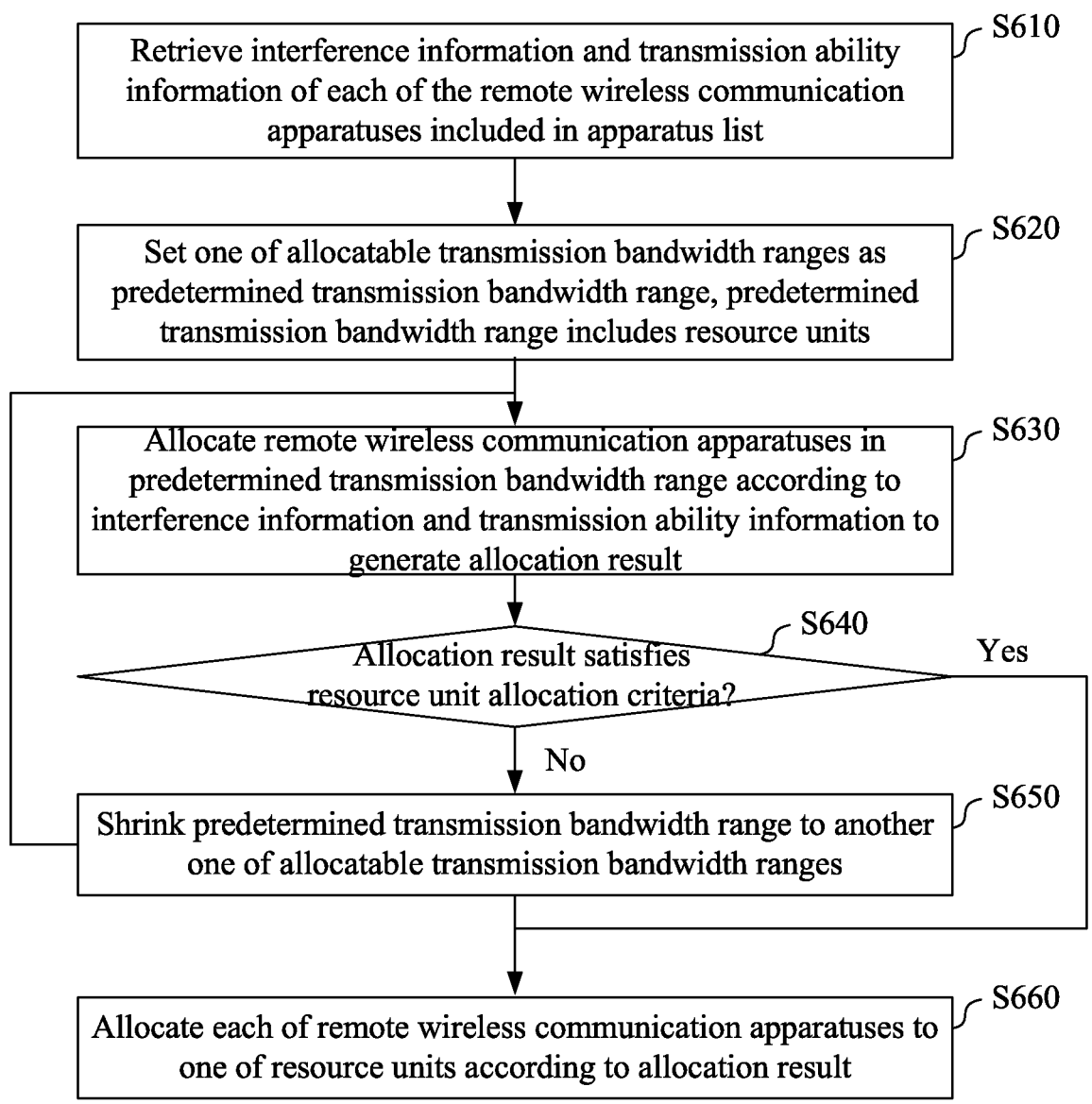
FIG. 6 illustrates a flow chart of a dynamic transmission bandwidth allocation method having dynamic transmission bandwidth allocation mechanism according to an embodiment of the present invention.

Reference is now made to FIG. 6. FIG. 6 illustrates a flow chart of a dynamic transmission bandwidth allocation method 600 having dynamic transmission bandwidth allocation mechanism according to an embodiment of the present invention.

Besides the apparatus described above, the present invention further discloses the dynamic transmission bandwidth allocation method 600 that can be used in such as, but not limited to the wireless communication apparatus 100 illustrated in FIG. 1. An embodiment of the dynamic transmission bandwidth allocation method 600 is illustrated in FIG. 6 and includes the steps outlined below.

In step S610, the interference information 140 and the transmission ability information 145 of each of the remote wireless communication apparatuses included in the apparatus list 135 are retrieved.

In step S620, one of the allocatable transmission bandwidth ranges 200~220 is set to be the predetermined transmission bandwidth range, wherein the predetermined transmission bandwidth range includes the resource units.

In step S630, the remote wireless communication apparatuses 150A~150D are allocated in the predetermined transmission bandwidth range according to the interference information 140 and the transmission ability information 145 to generate an allocation result.

In step S640, whether the allocation result satisfies resource unit allocation criteria is determined. In an embodiment, the resource unit allocation criteria include having the remote wireless communication apparatuses 150A~150D allocated to the resource units having no bandwidth overlapping each other, having the resource units that at least part of the remote wireless communication apparatuses 150A~150D allocated to correspond to the primary channel, and having the amount of the resource units that the remote wireless communication apparatuses are allocated to exceeds the threshold value.

In step S650, the predetermined transmission bandwidth range is shrunk to another one of the allocatable transmission bandwidth ranges when the allocation result does not satisfy the resource unit allocation criteria. The flow goes back to step S640 to determine whether the allocation result generated accordingly satisfies the resource unit allocation criteria.

In step S660, each of the remote wireless communication apparatuses 150A~150D is allocated to one of the resource units according to the allocation result when the allocation result satisfies the resource unit allocation criteria, so as to perform communication with the remote wireless communication apparatuses 150A~150D through the communication circuit 110.

It is appreciated that the embodiments described above are merely an example. In other embodiments, it is appreciated that many modifications and changes may be made by those of ordinary skill in the art without departing, from the spirit of the invention.

In summary, the wireless communication apparatus having dynamic transmission bandwidth allocation mechanism and the dynamic transmission bandwidth allocation method thereof of the present invention use low-complexity allocation algorithm to allocate the remote wireless communication apparatuses to the resource units and to shrink a bandwidth of the resource units to perform allocation again such that the resource units within the transmission bandwidth range can be allocated dynamically and efficiently.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A wireless communication apparatus having dynamic transmission bandwidth allocation mechanism comprising:
   a communication circuit;
   a storage circuit configured to store a computer executable command; and
   a processing circuit configured to retrieve and execute the computer executable command to execute a dynamic transmission bandwidth allocation method comprising:
      retrieving interference information and transmission ability information of each remote wireless communication apparatuses comprised in an apparatus list;
      setting one of allocatable transmission bandwidth ranges to be a predetermined transmission bandwidth range, wherein the predetermined transmission bandwidth range comprises multiple resource units (RUs);
      allocating the remote wireless communication apparatuses in the predetermined transmission bandwidth range according to the interference information and the transmission ability information to generate an allocation result;
      determining whether the allocation result satisfies resource unit allocation criteria;
      shrinking the predetermined transmission bandwidth range to another one of the allocatable transmission bandwidth ranges when the allocation result does not satisfy the resource unit allocation criteria, so as to determine whether the allocation result generated accordingly satisfies the resource unit allocation criteria; and allocating each of the remote wireless communication apparatuses to one of the resource units according to the allocation result when the allocation result satisfies the resource unit allocation criteria, so as to perform communication with the remote wireless communication apparatus through the communication circuit.

2. The wireless communication apparatus of claim 1, wherein the dynamic transmission bandwidth allocation method further comprises:

shrinking the predetermined transmission bandwidth range according to a size order of the allocatable transmission bandwidth ranges when the communication packet that is supposed to be transmitted through the communication performed with the remote wireless communication apparatuses is not a response packet.

3. The wireless communication apparatus of claim 1, wherein the dynamic transmission bandwidth allocation method further comprises:

shrinking the predetermined transmission bandwidth range directly to a primary transmission bandwidth range of the allocatable transmission bandwidth ranges corresponding to a primary channel when the communication packet that is supposed to be transmitted through the communication performed with the remote wireless communication apparatuses is a response packet.

4. The wireless communication apparatus of claim 1, wherein the dynamic transmission bandwidth allocation method further comprises:

determining the resource units that cause interference on the remote wireless communication apparatuses according to the interference information; and allocating each of the remote wireless communication apparatuses to one of the resource units from a lowest frequency to a highest frequency without being interfered thereby according to an order of the transmission ability information and apparatus information of the remote wireless communication apparatuses in the apparatus list to generate the allocation result.

5. The wireless communication apparatus of claim 1, wherein the resource unit allocation criteria comprise having the remote wireless communication apparatuses allocated to the resource units having no bandwidth overlapping each other, having the resource units that at least part of the remote wireless communication apparatuses allocated to correspond to a primary channel, and having an amount of the resource units that the remote wireless communication apparatuses are allocated to exceeds a threshold value.

6. A dynamic transmission bandwidth allocation method having dynamic transmission bandwidth allocation mechanism used in a wireless communication apparatus, comprising:

retrieving interference information and transmission ability information of each remote wireless communication apparatuses comprised in an apparatus list;

setting one of allocatable transmission bandwidth ranges to be a predetermined transmission bandwidth range, wherein the predetermined transmission bandwidth range comprises multiple resource units (RUs);

allocating the remote wireless communication apparatuses in the predetermined transmission bandwidth range according to the interference information and the transmission ability information to generate an allocation result;

determining whether the allocation result satisfies resource unit allocation criteria;

shrinking the predetermined transmission bandwidth range to another one of the allocatable transmission bandwidth ranges when the allocation result does not satisfy the resource unit allocation criteria, so as to determine whether the allocation result generated accordingly satisfies the resource unit allocation criteria; and allocating each of the remote wireless communication apparatuses to one of the resource units according to the allocation result when the allocation result satisfies the resource unit allocation criteria, so as to perform communication with the remote wireless communication apparatus through a communication circuit.

7. The dynamic transmission bandwidth allocation method of claim 6, further comprising:

shrinking the predetermined transmission bandwidth range according to a size order of the allocatable transmission bandwidth ranges when the communication packet that is supposed to be transmitted through the communication performed with the remote wireless communication apparatuses is not a response packet.

8. The dynamic transmission bandwidth allocation method of claim 6, further comprising:

shrinking the predetermined transmission bandwidth range directly to a primary transmission bandwidth range of the allocatable transmission bandwidth ranges corresponding to a primary channel when the communication packet that is supposed to be transmitted through the communication performed with the remote wireless communication apparatuses is a response packet.

9. The dynamic transmission bandwidth allocation method of claim 6, further comprising:

determining the resource units that cause interference on the remote wireless communication apparatuses according to the interference information; and allocating each of the remote wireless communication apparatuses to one of the resource units ranging from a lowest frequency to a highest frequency without being interfered thereby according to an order of the transmission ability information and apparatus information of the remote wireless communication apparatuses in the apparatus list to generate the allocation result.

10. The dynamic transmission bandwidth allocation method of claim 6, wherein the resource unit allocation criteria comprise having the remote wireless communication apparatuses allocated to the resource units having no bandwidth overlapping each other, having the resource units that at least part of the remote wireless communication apparatuses allocated to correspond to a primary channel, and having an amount of the resource units that the remote wireless communication apparatuses are allocated to exceeds a threshold value.

* * * * *